United States Patent [19]

Nonaka

[11] Patent Number: 5,798,800
[45] Date of Patent: Aug. 25, 1998

[54] APPARATUS FOR CONTROLLING A SWITCHER AND A SPECIAL EFFECTS DEVICE

[75] Inventor: Ryuji Nonaka, Kanagawa, Japan

[73] Assignee: Sony Corporation, Tokyo, Japan

[21] Appl. No.: 834,690

[22] Filed: Apr. 1, 1997

Related U.S. Application Data

[63] Continuation of Ser. No. 402,527, Mar. 10, 1995, abandoned.

[30] Foreign Application Priority Data

Mar. 19, 1994 [JP] Japan .................................. 6-074036

[51] Int. Cl.$^6$ ...................................................... H04N 9/74
[52] U.S. Cl. ............................ 348/578; 348/584; 348/705
[58] Field of Search ........................... 348/578, 584, 348/598, 599, 600, 722, 705; H04N 5/578, 5/722, 9/74, 9/75, 9/76, 5/584

[56] References Cited

U.S. PATENT DOCUMENTS

| | | |
|---|---|---|
| 3,627,914 | 12/1971 | Davies ........................................ 348/586 |
| 4,750,050 | 6/1988 | Belmares-Sarabia et al. ........... 348/584 |
| 4,858,011 | 8/1989 | Jackson et al. . |
| 5,175,622 | 12/1992 | Inoue et al. . |
| 5,282,038 | 1/1994 | Lowe . |

FOREIGN PATENT DOCUMENTS

| | | |
|---|---|---|
| 0 239 262 | 9/1987 | European Pat. Off. . |
| 0 395 372 | 10/1990 | European Pat. Off. . |
| 2096868 | 10/1982 | United Kingdom ................... 364/188 |

*Primary Examiner*—Christopher C. Grant
*Attorney, Agent, or Firm*—Frommer Lawrence & Haug LLP; William S. Frommer

[57] ABSTRACT

A video signal editing apparatus that can easily switch the entire apparatus to a predetermined setting. A video signal editing apparatus which specifies the desired video signal out of a plurality of video input signals input to a switcher to selectively output the desired video signal to a plurality of video signal processing devices, and which selects the desired video signal out of the video signals obtained through the plurality of video signal processing devices and the plurality of video input signals to finally output the desired video signal, comprises an operation control device for controlling the switcher and the plurality of video signal processing device, the operation control device having a memory for storing or reading the predetermined setting of the switcher and the predetermined setting of the plurality of video signal processing devices, the setting of the switcher and the setting of the plurality of video signal processing devices being simultaneously stored in the memory and being simultaneously read from the memory, thereby the entire apparatus can be easily switched to the predetermined setting.

6 Claims, 4 Drawing Sheets

APPARATUS FOR CONTROLLING A SWITCHER AND A SPECIAL EFFECTS DEVICE

This application is a continuation of application Ser. No. 08/402,527, filed Mar. 10, 1995 now abandoned.

BACKGROUND OF THE INVENTION

1. Field of the Invention

The present invention relates to a video signal editing apparatus, and more particularly to an improvement of a video signal editing apparatus for editing a video signal by using a special effects device which gives a special image effect to a video signal.

2. Description of the Related Art

In a video signal editing apparatus used at producing television program and so on, a switcher and a plurality of special effects devices that generate special effects such as wipes and mosaics are used in combination.

With this construction, the video signal in which special effects are given and the video signal in which special effects are not given are edited arbitrarily, so that desired video signal can be obtained. More specifically, multiplied video signal editing apparatus can be obtained.

The switcher and the special effects devices can be used separately, thereby operated by respective operation panels.

Moreover, there is a case that relation between input and output in the switcher and kinds and degrees of special effects in the special effects device are changed in every video signal for arbitrary times. Therefore, it is considered that the data regarding the setting status is previously memorized in a memory, and that memorized data is read out, so that it can be set easily. This function is called snapshot.

In the case where snapshot function is applied to the video signal editing apparatus composed of the switcher and the special effects devices described above, the operation panels are separated respectively, so that snapshot function to the switcher must be designated by the operation panel of the switcher and snapshot function to the special effects devices must be designated by the operation panel of the special effects devices. More specifically, when an operator executes snapshot function, the operator have to memorize snapshots designated to both the switcher and the special effects devices, and designate by respective operation panels. Therefore, it becomes complicated to operate by the operator, and difficult to make snapshots correspond to the switcher and the special effects devices.

SUMMARY OF THE INVENTION

In view of the foregoing, an object of the present invention is to provide a video signal editing apparatus which can solve the aforementioned problems.

The foregoing object and other objects of the invention have been achieved by the provision of a video signal editing apparatus, comprising: a switcher having a plurality of input ends to be input each video signal and a plurality of output end, for outputting arbitrary video signal out of the video signal input to the plurality of input end from arbitrary output end out of the plurality of output end based on the first control signal; special effects devices connected with one of the output ends of the switcher, for giving special effects to the video signal supplied from the switcher based on the second control signal; and control means having a display unit for displaying information regarding control of the switcher and the special effects devices, an input unit for inputting display information to be displayed on the display unit and determination information showing determination of the display information, and a control unit for generating the first and second control signal based on the display information when the determination information is input, and for supplying the first control signal to the switcher and the second control signal to the special effects devices.

Furthermore, in the video signal editing apparatus of the present invention, the control means have a memory to memorize control data with regard to the display information, and the control unit controls the memory to memorize the control data when the determination information is input by the input unit, and the special effects devices have the first special effects device connected with one of output ends of the switcher and the second special effects device connected with output end of the first special effects device and one of output ends of the switcher.

Furthermore, the video signal editing apparatus of the present invention have an operation control device connected with the switcher and the special effects device for generating the first and second control signals.

Furthermore, the operation control device have the control means having a memory for memorize control data with regard to the display information, and the control unit for controlling the memory to memorize the control data when the determination information is input by the input unit.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) Overall Construction of the Editing Apparatus

Figure 1:
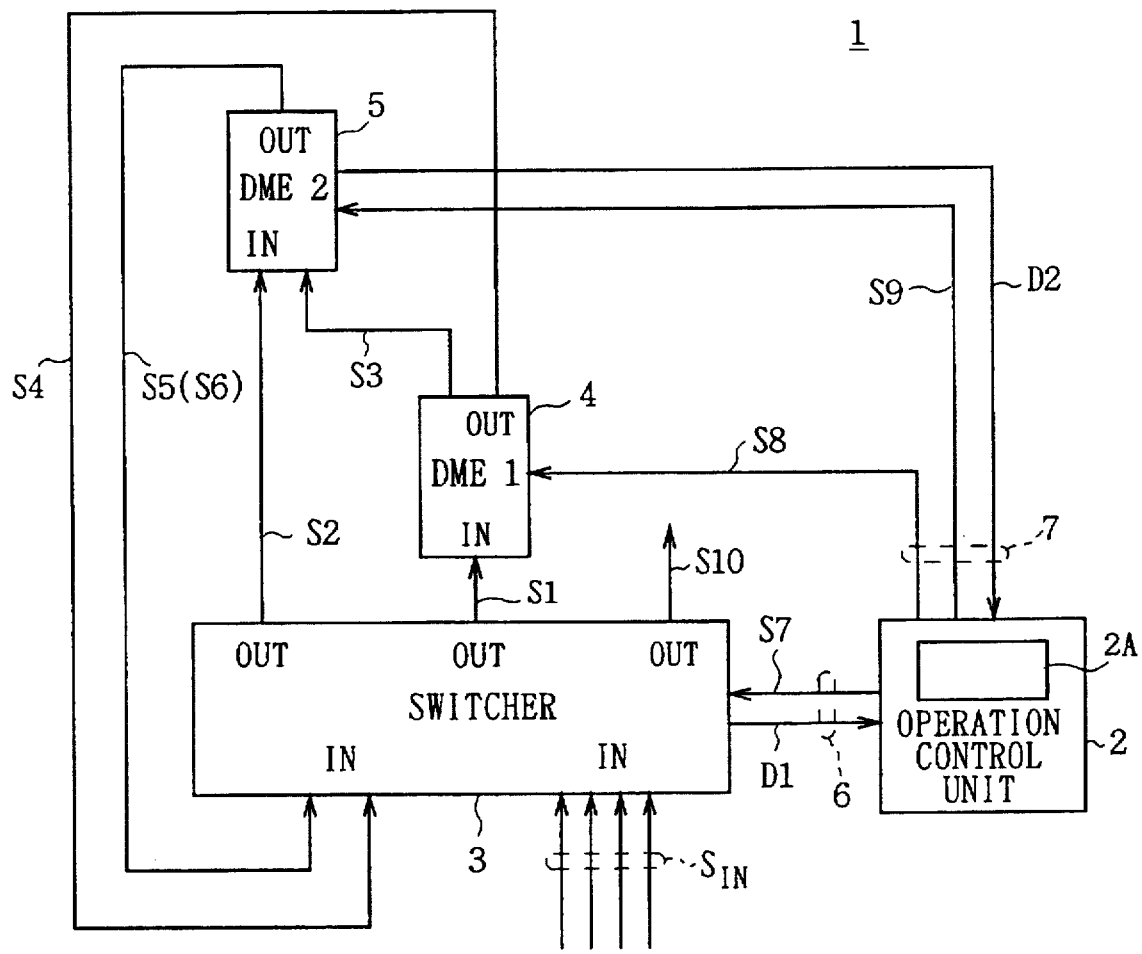
FIG. 1 is a block diagram showing the video signal editing apparatus of the present invention.

FIG. 1 shows a video signal editing apparatus 1 as a whole which outputs a specified video signal out of the plurality of image input signals to a plurality of special effects devices, and which selects desired video signal out of video signals and a plurality of image input signals and output it.

The video signal editing apparatus 1 is composed of an operation control unit 2 having an operation input unit 2A and a switcher 3 controlled based on switcher control signal S7 output from the operation control unit 2. For example, the other apparatuses such as a broadcasting television camera, a VTR, and the like (not shown) are connected to the plurality of input end IN of the switcher 3, in which a group of image input signals $S_{IN}$ composed of a plurality of image input signal output from other apparatuses is input.

A first and a second special effects devices 4 and 5 for generating special effects such as wipes and mosaics are connected to the plurality of output end OUT of the switcher 3. Here, as the special effects devices 4 and 5, DME (digital multi-effecter) is used which gives various special effects to the digital video signal. The switcher 3 outputs the image input signals selected based on the switcher control signal S7 from the operation control unit 2 out of the group of image input signals $S_{IN}$, to the first and second special effects devices 4 and 5 as the first and second DME input signals S1 and S2.

The first special effects device 4 gives predetermined special effects to the first DME input signal S1, and then outputs it either to the second special effects device 5 as a DME-synthesized input signal S3 or to the switcher 3 again as the first DME output signal S4. The operation of the first special effects device 4 is executed based on the DME control signal S8 from the operation control unit 2. On the other hand, the second DME special effects device 5 gives predetermined special effects to the second DME input signal S2 or the third DME input signal S3, and then supplies it to the switcher 3 as the second DME output signal S5. Further, the second special effects device 5 synthesizes the third DME-synthesized input signal S3 with the second DME input signal S2, and again supplies it to the switcher 3 as DME-synthesized output signal S6. The operation of the second special effects device 5 is executed based on DME control signal S9 from the operation control unit 2.

Incidentally, since the video signal editing apparatus of the present invention has two special effects devices, the first special effects device 4 and the second special effects device 5, the special effects can be obtained such that two images synthesized by, for example, wipe and so on, move respectively in the screen.

The operation control unit 2 and the switcher 3 are connected to each other via a communication port (hereinafter referred to as a switcher communication port) 6, so that data D1 for checking the operation of the switcher 3 is transmitted via the switcher communication port 6 from the switcher 3 to the operation control unit 2, and simultaneously switcher control signal S7 is transmitted via the switcher communication port 6 from the operation control unit 2 to the switcher 3.

Also, the operation control unit 2 and the first and second special effects devices 4 and 5 are connected with a communication port (hereinafter referred to as a DME communication port) 7. Data D2 indicating whether or not the second special effects device 5 processes images by using the DME-synthesized input signal S3 output from the first special effects device 4, is transmitted via the DME communication port 7 from the second special effects device 5 to the operation control unit 2, and simultaneously the first and second DME control signals S8 and S9 are transmitted via the DME communication port 7 to the first and second special effects devices 4 and 5, respectively.

Then, the operation control unit 2 finally selects arbitrary video signal from all the image input signals input to the switcher 3 from the switcher 3 as image selection signal S10, and then outputs it. Incidentally, the operation input unit 2A of the operation control unit 2 has a light-emitting display unit (not shown) which provides with a predetermined number of lamps corresponding to the group of image input signal $S_{IN}$ to be input to the switcher 3. The light-emitting display unit is so constituted as to light a lamp corresponding to the signal which is selectively output from the switcher 3 out of the group of image input signals $S_{IN}$ as the image selection signal S10.

In this manner, an operator can recognize which video signal is actually output out of the group of image input signals $S_{IN}$ input to the switcher 3 through a display on the light-emitting display unit provided on the operation input unit 2A. Furthermore, the operator can switch operate the switcher 3 and the first and second special effects devices 4 and 5 with visually confirming the light-emitting display unit.

(2) Construction of Operation Control Unit

Figure 2:
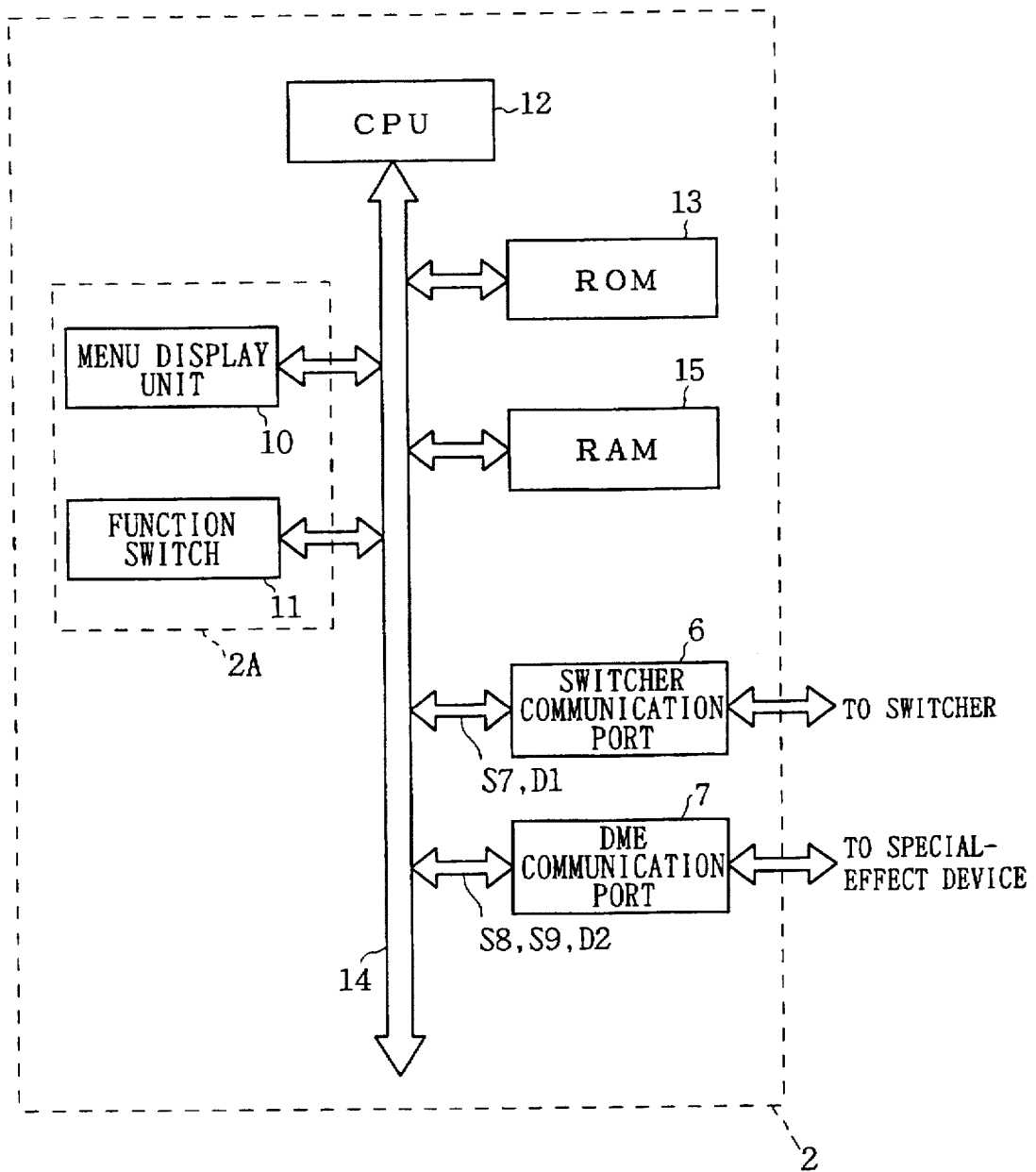
FIG. 2 is a block diagram showing an operation control unit of the present invention.

As shown in FIG. 2, the operation input unit 2A of the operation control unit 2 is composed of a menu display unit 10 and a function switch 11. A control signal is output from the function switch 11 in the operation input unit 2A to CPU (central processing unit) 12. The CPU 12 reads out program data which has been previously stored in read only memory (ROM) 13 to supply this program data to random access memory (RAM) 15 through a bus 14. This program data is memorized in RAM 15. The switcher control signal S7 is output to the switcher 3 via the switcher communication port 6, and simultaneously the first and second DME control signals S8 and S9 are output to the first and second DME special effects devices 4 and 5 via the DME communication port 7, respectively.

The switcher 3 is controlled based on the switcher control signal S7, and transmits the data D1 to the operation control unit 2 via the switcher communication port 6. The first and second special effects devices 4 and 5 are controlled based on the first and second control signals S8 and S9. Further, the second DME special effects device 5 sends out data D2 indicating whether or not the second special effects device 5 processes images by using the DME-synthesized input signal S3 output from the first DME special effects device 4 to the operation control unit 2 via the DME communication port 7.

The data D1 and D2 which are transmitted to the operation control unit 2 via the switcher communication port 6 and the DME communication port 7 respectively, are memorized in RAM 15 via the bus 14. Then, CPU 12 reads out the data D1 and the data D2 memorized in RAM 15, to output to the menu display unit 10 in the operation input unit 2A.

Figure 3:
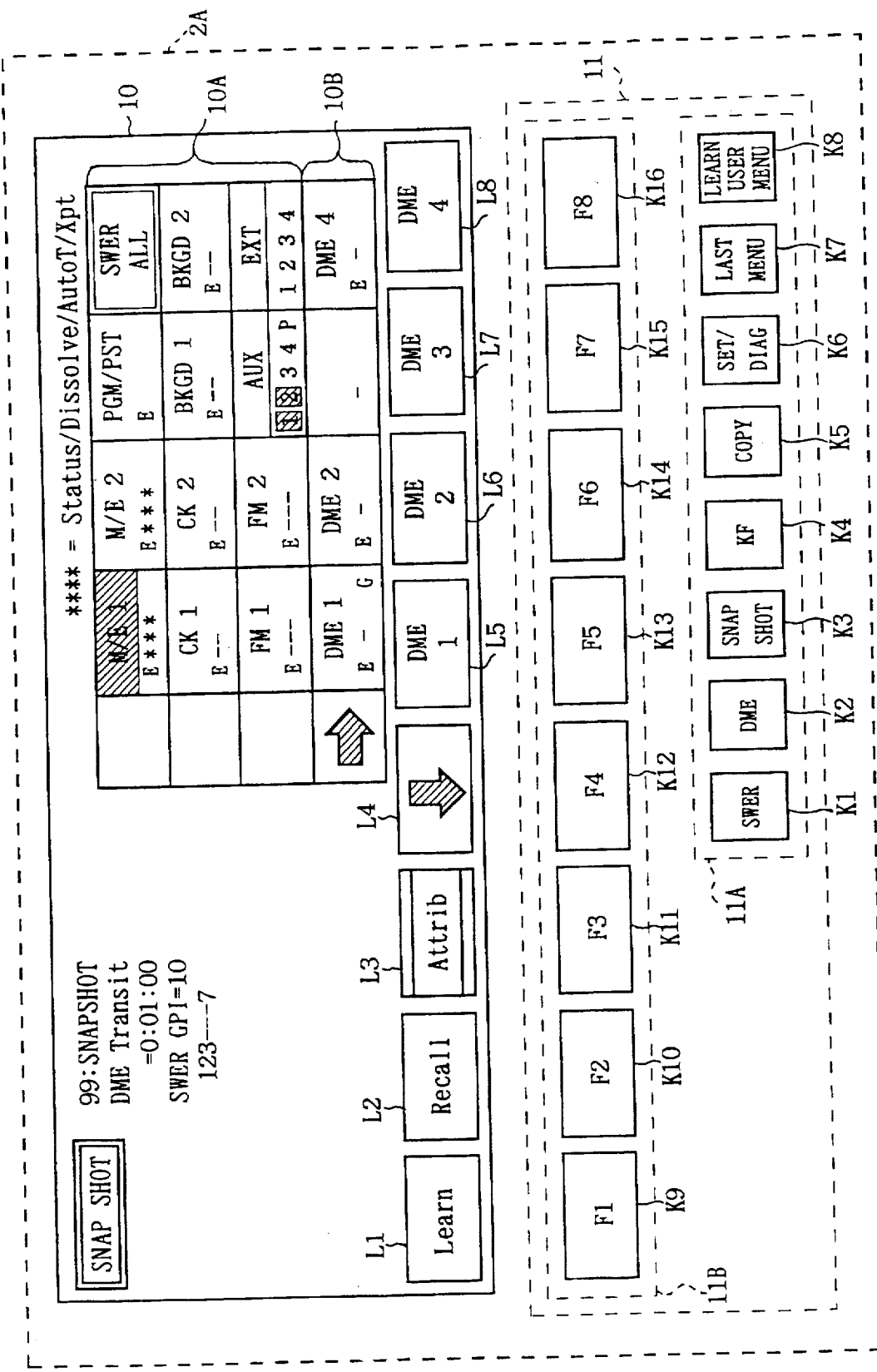
FIG. 3 is a plane view showing an external construction of the operation input unit of the present invention.

FIG. 3 shows the operation input unit 2A of the operation control unit 2. The operation input unit 2A provides the menu display unit 10 and the function switch 11. The function switch 11 is composed of a menu selection switch 11A for selecting menu from which functions such as snapshot and the like are allocated, and a menu execution switch 11B for executing predetermined processing based on the menu selected by the menu selection switch 11A.

The menu selection switch 11A is composed of function keys K1 to K8. For instance, when an operator selects a function key K3 indicative of "SNAPSHOT" out of the function keys K1 to K8 and operates it, each processing to perform snapshot is displayed on the display screen corresponding to the function keys K9 to K16 of the menu execution switch 11B.

In the menu display unit 10, the group of twelve blocks designated as 10A is display portions indicating setting status regarding the switcher 3, and the group of four blocks designated as 10B is display portions indicating setting status regarding the special effects devices 4 and 5.

Function display portions L1 to L8 are displayed corresponding to function keys K9 to K16, and FIG. 3 shows the display status in the case where function key K3 is pressed.

In this case, the function key K9 shows "Learn", i.e., the key for memorizing data regarding setting status of snapshot function to the switcher 3 and the special effects devices 4 and 5 in RAM 15. Incidentally, data regarding setting status of snapshot is memorized in an address (99 in case of FIG. 3) displayed on the menu display unit 10 in RAM 15.

Furthermore, the function key K10 shows "Recall", i.e., the key for reading out data regarding setting status of snapshot function to the switcher 3 and the special effects devices 4 and 5 from RAM 15. Incidentally, the data regarding setting status of snapshot is read out from the address (99 in case of FIG. 3) displayed on the menu display unit 10 in RAM 15.

(3) Processing Procedure of Operation Control Unit

Figure 4:
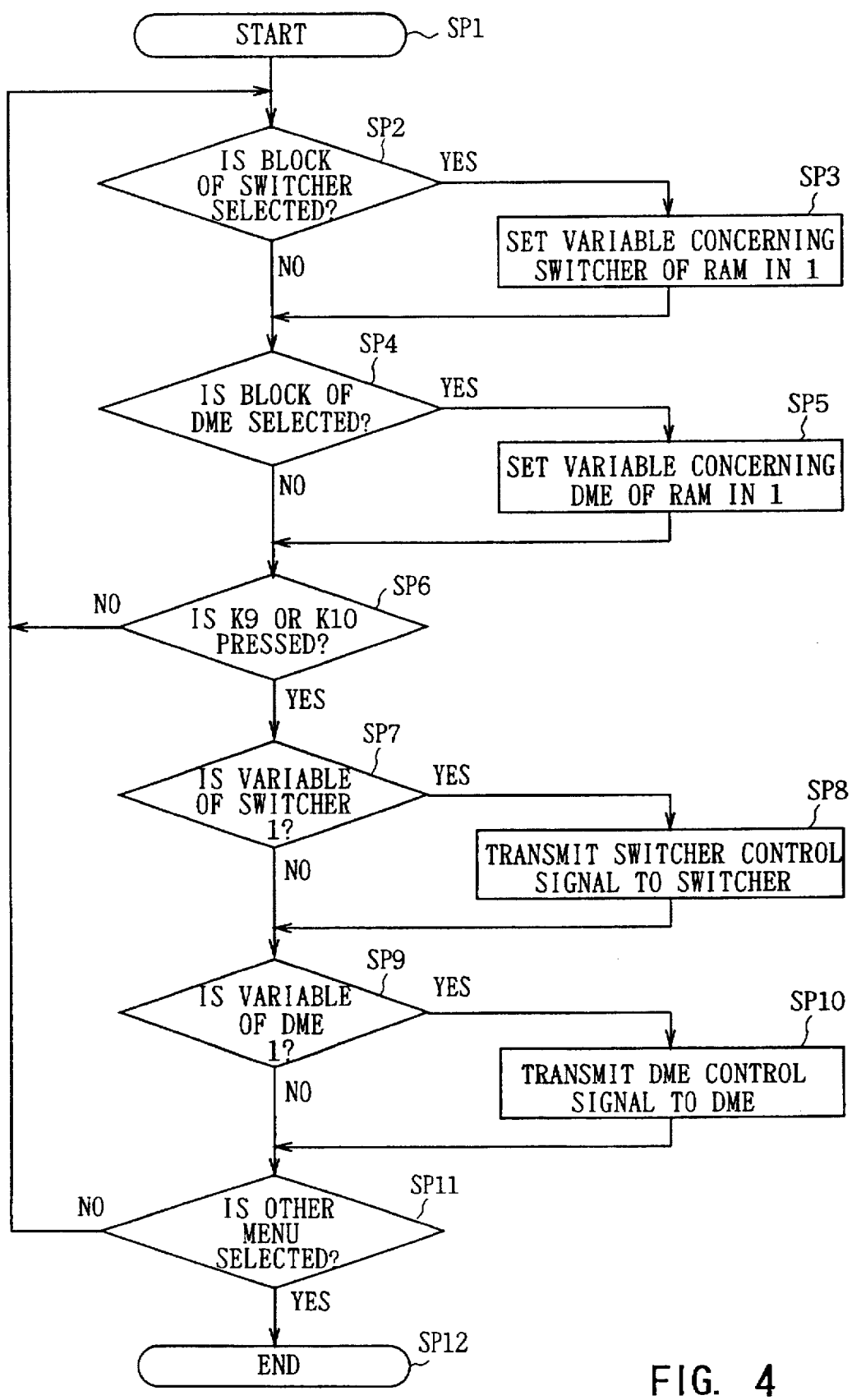
FIG. 4 is a flowchart showing a processing procedure of the present invention.

Subsequently, in the operation control unit 2, CPU 12 executes processing procedure shown in FIG. 4. When the menu selection switch 11A of the function switch 11 is operated and the function key K3 for executing snapshot is operated, the menu regarding processing for executing snapshot is displayed on the display screen of the menu display unit 10. And then, CPU 12 executes processing shown in FIG. 4.

First, CPU 12 proceeds from step SP1 to step SP2 to judge whether or not block of the switcher 3 is selected. Namely, at this step SP2, CPU 12 determines whether or not any of the blocks 10A regarding the switcher 3 is pressed. If an affirmative result is obtained here, CPU 12 proceeds to step SP3 to set variable concerning the switcher 3 which is memorized in RAM 15 from 0 in 1, and then proceeds to step SP4. At step SP3, information concerning selected block is also memorized in RAM 15. If a negative result is obtained, CPU 12 directly proceeds to step SP4 to judge whether or not the special effects devices 4 or 5 is selected. Namely, at this step SP4, CPU 12 determines whether or not any of the blocks 10B regarding the special effects devices 4 or 5 is pressed. If an affirmative result is obtained here, CPU 12 proceeds to step SP5 to set variable concerning the special effects device 4 or 5 which is memorized in RAM 15 from 0 in 1, and then proceeds to step SP6. At step SP5, information concerning selected block is also memorized in RAM 15. If a negative result is obtained, CPU 12 directly proceeds to step SP6 to judge whether or not the function key K9 or K10 is pressed. If a negative result is obtained here, CPU 12 returns to step SP2. On the contrary, if an affirmative result is obtained, CPU 12 proceeds to step SP7 to judge whether or not variable concerning the switcher 3 which is memorized in RAM 15 is 1. If an affirmative result is obtained at step SP7, CPU 12 proceeds to step SP8 to transmit the switcher control signal S7, i.e., control information regarding the switcher 3 displayed on the switcher information display portion 10A of the menu display unit 10, to the switcher 3 via the switcher communication port 6, and then proceeds to step SP9. On the contrary, if a negative result is obtained at step SP7, CPU 12 directly proceeds to step SP9.

At step SP9, CPU 12 judges whether or not variable regarding the special effects device 4 or 5 which is memorized in RAM 15 is 1. If an affirmative result is obtained, CPU 12 proceeds to step SP10 to transmit the first or second DME control signal S8 or S9, i.e., control information regarding the special effects device 4 or 5 displayed on the DME information portion 10B of the menu display unit 10, to the special effects device 4 or 5 via the DME communication port 7, and then proceeds to step SP11. On the contrary, if a negative result is obtained at step SP9, CPU 12 directly proceeds to step SP11.

At step SP11, CPU 12 judges whether or not the other menu is selected. Namely, CPU 12 detects whether or not function keys other than the function key K3, 3, i.e., K1, K2 and K4 to K8, are pressed. If the result is affirmative here, CPU 12 terminates this processing routine. On the contrary, if a negative result is obtained, CPU 12 returns to step SP2 to repeat aforementioned processings.

Therefore, in the video signal editing apparatus of the present invention, operation by the operator can be easier.

Moreover, it is possible to provide the video signal editing apparatus which is simplified to make snapshots correspond to the switcher and the special effects devices.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video signal editing apparatus comprising:

switcher means for receiving a plurality of input video signals and for outputting at least one of the received video signals in accordance with a first control signal;

special effects means for receiving an output video signal from said switcher means and for performing special effects processing on said output video signal in accordance with a second control signal; and control means having a plurality of keys representing a plurality of functions such that a desired one or ones of said functions are selected by an operator by activating the corresponding key or keys in which one of said keys represents a snapshot function for said switcher means and said special effects means such that an operator may initiate said snapshot function for said switcher means and said special effects means by activating the snapshot function key, display means for displaying information corresponding to the functions represented by said keys and to the function or functions selected by said operator, and means for generating said first and second control signals based on the selected function or functions and for supplying said first control signal to said switcher means and said second control signal to said special effects means so as to control the same, in which the generating and supplying means includes means for storing information and for retrieving the stored information so as to form control signals and automatically supplying the control signals to said switcher means and said special effects means such that, during said snapshot function, information pertaining to a respective setting of said switcher means and said special effects means is stored and subsequently retrieved so as to form first and second snapshot control signals which are automatically supplied to said switcher means and said special effects means so as to initiate a subsequent setting of said switcher means and said special effects means, respectively.

2. The video signal editing apparatus according to claim 1, wherein said control means has a memory for storing control data with regard to said display information and means for controlling said memory to store said control data in accordance with the selected function or functions.

3. The video signal editing apparatus according to claim 1, wherein said special effects means includes a first special effects device coupled to said switcher means and a second special effects device coupled to an output terminal of said first special effects device and said switcher means.

4. An apparatus coupled to a switcher and a special effects device for controlling a plurality of predetermined functions including a snapshot function involving said switcher and said special effects device, said apparatus comprising:

input means for selecting a desired function or functions, said input means having a first plurality of keys representing a plurality of fixed functions in which one of said first plurality of keys represents said snapshot function such that an operator may initiate said snapshot function of said switcher and said special effects device by activating the snapshot function key and a second plurality of keys representing a plurality of changeable functions in which the changeable functions are set in accordance with the selected fixed function;

display means for displaying information corresponding to the functions currently available to said operator; and means for controlling said switcher and said special effects device in accordance with the selected function or functions, in which the controlling means includes means for storing information and for retrieving the stored information so as to form control signals therefrom and automatically supplying the formed control signals to said switcher and said special effects device such that, during said snapshot function, information pertaining to a respective setting of said switcher and said special effects device is stored and subsequently retrieved so as to form first and second snapshot control signals which are automatically supplied to said switcher and said special effects device so as to initiate a subsequent setting of said switcher and said special effects device, respectively.

5. The apparatus according to claim 4, wherein the controlling means has a memory for storing control data with regard to said display information and means for controlling said memory to store said control data in accordance with the selected function or functions.

6. A video signal editing apparatus comprising:

switcher means for receiving a plurality of input video signals and for outputting at least one of the received video signals in accordance with a first control signal;

special effects means for receiving an output video signal from said switcher means and for performing special effects processing on said output video signal in accordance with a second control signal;

selecting means for selecting a desired function or functions, said selecting means having a plurality of dedicated keys each representing a predetermined fixed function and a plurality of changeable keys representing a plurality of changeable functions in which the changeable functions are set in accordance with the selected fixed function, wherein one of said dedicated keys represents a snapshot function for said switcher means and said special effects means such that an operator may initiate said snapshot function of said switcher means and said special effects means by activating the snapshot function dedicated key;

display means for displaying information corresponding to the functions currently available to said operator; and means for generating said first and second control signals based on the selected function or functions and for respectively supplying said first and second control signals to said switcher means and said special effects means, in which the generating and supplying means includes means for storing information and for retrieving the stored information so as to form control signals therefrom and automatically supplying the control signals to said switcher means and said special effects means such that, during said snapshot function, information pertaining to a respective setting of said switcher means and said special effects means is stored and subsequently retrieved so as to form first and second snapshot control signals which are automatically supplied to said switcher means and said special effects means so as to initiate a subsequent setting of said switcher means and said special effects means, respectively.

* * * * *